Patented Oct. 11, 1927.

1,645,098

UNITED STATES PATENT OFFICE.

WALTER FRIEDRICH, OF NIEDERSCHONEWEIDE, GERMANY, ASSIGNOR TO GENERAL ELECTRIC COMPANY, A CORPORATION OF NEW YORK.

LEAD CADMIUM ALLOYS.

No Drawing. Application filed April 12, 1924, Serial No. 706,191, and in Germany June 14, 1923.

The present invention comprises a new alloy which is particularly useful for cable casings, although it is not limited in use to this particular purpose.

Heretofore, cable casings have consisted almost exclusively of pure lead or a lead alloy containing a small amount of tin. Not only does the addition of tin to the lead increase the cost of the alloy, but in any event both pure lead or lead tin alloy are relatively soft and have low tensile strength.

In accordance with my invention, the strength and hardness of lead is materially increased by alloyage therewith of a small portion of cadmium.

The production of the lead cadmium alloy in accordance with my invention presents no unusual difficulties. The fusion temperatures of lead and cadmium are so near to each other that the cadmium can be readily alloyed with the lead. Lead fuses at 327° C.; cadmium fuses at 321° C. As the boiling point of cadmium (778° C.) lies very far above its fusion temperature, losses of cadmium by evaporation are negligible.

The alloyage of the cadmium to the lead can be carried out by merely stirring the required amount of cadmium into the molten lead, ordinarily about 0.2 to 1% by weight.

A lead cadmium alloy containing by weight about 0.8% of cadmium has about the same hardness and extensibility and greater strength than lead containing about 3% of tin. Furthermore, the lead cadmium alloy offers more resistivity to corrosion. As compared to tin or antimony alloys of lead, the lead cadmium alloy offers a further essential advantage. In consequence of the slight differences in the specific weights of their components, formation of segregations in the liquid state of the alloy is more easily avoided than in the case of lead alloys with either tin or antimony.

What I claim as new and desire to secure by Letters Patent of the United States, is:—

1. As an article of manufacture a cable casing consisting of an alloy of lead and cadmium, the cadmium being present as a minor constituent.

2. As an article of manufacture, an alloy of lead and cadmium, the latter constituent constituting by weight about 0.2 to 1 per cent of the alloy, the balance of the alloy consisting of lead.

In witness whereof, I have hereunto set my hand this 27th day of March, 1924.

WALTER FRIEDRICH.